US008703037B2

(12) United States Patent
Hull et al.

(10) Patent No.: US 8,703,037 B2
(45) Date of Patent: *Apr. 22, 2014

(54) EDGE SMOOTHNESS WITH LOW RESOLUTION PROJECTED IMAGES FOR USE IN SOLID IMAGING

(75) Inventors: Charles W. Hull, Santa Clarita, CA (US); Jouni P. Partanen, Santa Monica, CA (US); Charles R. Sperry, Florence, MA (US); Patrick Dunne, Limerick (IE); Suzanne M. Scott, Springfield, VT (US); Dennis F. McNamara, Charlestown, NH (US); Chris R. Manners, Moorpark, CA (US)

(73) Assignee: 3D Systems, Inc., Rock Hill, SC (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/797,198

(22) Filed: Jun. 9, 2010

(65) Prior Publication Data
US 2011/0207057 A1 Aug. 25, 2011

Related U.S. Application Data

(63) Continuation of application No. 11/096,748, filed on Apr. 1, 2005, now Pat. No. 7,758,799.

(51) Int. Cl.
*B29C 35/08* (2006.01)
*B29C 41/02* (2006.01)
*G06F 19/00* (2011.01)
*G06K 9/36* (2006.01)

(52) U.S. Cl.
USPC ........... 264/401; 345/613; 382/269; 382/285; 700/120

(58) Field of Classification Search
USPC .......... 264/308, 401; 700/119, 120; 345/611, 345/613; 382/269, 285
See application file for complete search history.

(56) References Cited

U.S. PATENT DOCUMENTS

| 4,752,498 A | 6/1988 | Fudim |
| 4,851,656 A | 7/1989 | Straayer |
| 5,049,901 A | 9/1991 | Gelbart |
| 5,130,064 A | 7/1992 | Smalley et al. |
| 5,184,307 A | 2/1993 | Hull et al. |
| 5,247,180 A | 9/1993 | Mitcham et al. |

(Continued)

FOREIGN PATENT DOCUMENTS

| DE | 02008019 | 9/1970 |
| DE | 19957370 | 11/1999 |

(Continued)

OTHER PUBLICATIONS

"Rigorous Simulation of 3D Masks", Burger et al, Zuse Institute Berlin, Oct. 24, 2006.

(Continued)

*Primary Examiner* — Leo B Tentoni

(57) ABSTRACT

A solid imaging apparatus and method employing sub-pixel shifting in multiple exposures of the digitally light projected image of a cross-section of a three-dimensional object on a solidifiable liquid medium. The multiple exposures provide increased resolution, preserving image features in a three-dimensional object and smoothing out rough or uneven edges that would otherwise be occur using digital light projectors that are limited by the number of pixels in an image projected over the size of the image. Algorithms are used to select pixels to be illuminated within the boundary of each image projected in the cross-section being exposed.

18 Claims, 4 Drawing Sheets

(56) References Cited

U.S. PATENT DOCUMENTS

| | | |
|---|---|---|
| 5,278,949 A | 1/1994 | Thayer |
| 5,454,069 A | 9/1995 | Knapp et al. |
| 5,506,607 A | 4/1996 | Sanders et al. |
| 5,510,066 A | 4/1996 | Fink et al. |
| 5,523,193 A | 6/1996 | Nelson |
| 5,528,733 A | 6/1996 | Luttmer |
| 5,557,327 A | 9/1996 | Hasegawa et al. |
| 5,650,260 A | 7/1997 | Onishi |
| 5,693,144 A | 12/1997 | Jacobs et al. |
| 5,768,134 A | 6/1998 | Swaelens et al. |
| 5,894,036 A | 4/1999 | Tylko |
| 5,900,207 A | 5/1999 | Danforth et al. |
| 5,902,537 A | 5/1999 | Almquist et al. |
| 6,001,297 A | 12/1999 | Partanen et al. |
| 6,029,096 A | 2/2000 | Manners et al. |
| 6,048,487 A | 4/2000 | Almquist et al. |
| 6,051,179 A | 4/2000 | Hagenau |
| 6,215,095 B1 | 4/2001 | Partanen et al. |
| 6,312,134 B1 | 11/2001 | Jain et al. |
| 6,399,010 B1 | 6/2002 | Guertin et al. |
| 6,500,378 B1 | 12/2002 | Smith |
| 6,508,971 B2 | 1/2003 | Leyden et al. |
| 6,547,552 B1 | 4/2003 | Fudim |
| 6,665,048 B2 | 12/2003 | Gelbart |
| 6,833,231 B2 | 12/2004 | Moussa et al. |
| 6,833,234 B1 | 12/2004 | Bloomstein et al. |
| 6,855,482 B2 | 2/2005 | McLean et al. |
| 7,088,432 B2 | 8/2006 | Zhang |
| 7,154,515 B2 | 12/2006 | Donahue et al. |
| 7,636,610 B2 | 12/2009 | Schillen et al. |
| 7,758,799 B2 | 7/2010 | Hull et al. |
| 7,790,093 B2 | 9/2010 | Shkolnik et al. |
| 7,831,328 B2 | 11/2010 | Schillen et al. |
| 2001/0048184 A1 | 12/2001 | Ueno |
| 2004/0075882 A1 | 4/2004 | Meisburger |
| 2005/0089214 A1 | 4/2005 | Rubbert et al. |
| 2005/0248061 A1 | 11/2005 | Shkolnik et al. |
| 2005/0248062 A1 | 11/2005 | Shkolnik et al. |
| 2005/0259785 A1 | 11/2005 | Zhang |
| 2006/0239588 A1 | 10/2006 | Hull et al. |
| 2007/0029706 A1 | 2/2007 | Ueno |

FOREIGN PATENT DOCUMENTS

| | | |
|---|---|---|
| DE | 19929199 | 1/2001 |
| EP | 0676275 | 10/1995 |
| EP | 1192041 | 3/2003 |
| EP | 1849587 | 10/2007 |
| EP | 1864785 | 12/2007 |
| EP | 2266781 | 12/2010 |
| FR | 2692053 | 12/1993 |
| JP | 1995-108609 | 4/1995 |
| JP | 1995108609 | 11/1996 |
| JP | 200221834 | 7/2002 |
| WO | 9804950 | 2/1998 |
| WO | 9963385 | 12/1999 |
| WO | WO0140866 | 6/2001 |
| WO | WO0236331 | 5/2002 |
| WO | 2005025838 | 3/2005 |
| WO | WO2005110722 | 11/2005 |
| WO | WO2006109425 | 10/2006 |

OTHER PUBLICATIONS

Zhenhai Zhu;, "A parameterized mask model for lithography simulation," Design Automation Conference 2009, Jul. 26-31, 2009.
English Translation of DE 19957370A1, (Jun. 13, 2001).
European Search Report for counterpart European application EP07016909.9 mailed Jan. 15, 2008, 9 pages.
European Search Report for counterpart European application EP06251473.2, mailed Jan. 31, 2008, 4 pages.
European Search Report for counterpart foreign application EP06251474, mailed Jan. 31, 2008, 4 pages.
U.S. Appl. No. 11/468,090, filed Aug. 29, 2006.
IEIC Technical Report dated Sep. 2001 by K Takahashi entitled "A New Application of DMD to Photolithography and Rapid Prototyping System".
A Thesis dated Jun. 2008 by Jonathan Zyzalo, "Masked Projection Stereolithography: Improvement of the Limaye Model for Curing Single Layer Medium Sized Parts" (pp. i-xiii; 1-75).
A Thesis dated Jun. 2008 by Jonathan Zyzalo, "Masked Projection Stereolithography: Improvement of the Limaye Model for Curing Single Layer Medium Sized Parts" (pp. 76-168).
A Thesis dated Jun. 2008 by Jonathan Zyzalo, "Masked Projection Stereolithography: Improvement of the Limaye Model for Curing Single Layer Medium Sized Parts" (pp. 169-260).
Enghlish translation of Japanese Office Action, dated Aug. 2, 2011, of Japanese counterpart.
Dictonary.com definition for Bitmap from the American Hertigage, 4th edition (2009).
Notice of Opposition Against European Patent No. EP 2148244 received at the European Patent Office on Oct. 3, 2012 (39 pages).
English translation of Japanese Notice of Grounds for Rejection dated Jan. 15, 2013 (3 pages).

US 8,703,037 B2

EDGE SMOOTHNESS WITH LOW RESOLUTION PROJECTED IMAGES FOR USE IN SOLID IMAGING

CROSS REFERENCE TO RELATED APPLICATION

This application is a continuation of copending U.S. patent application Ser. No. 11/096,748, filed Apr. 1, 2005, which granted as U.S. Pat. No. 7,758,799 on Jul. 20, 2010 and which is hereby incorporated herein in its entirety by reference.

FIELD OF INVENTION

The present invention is directed to a pixel shifting technique to achieve high resolution and preserve image details in an image projection system limited by the projected size of the pixels, such as occurs with light valve projectors using DMD or LCD based projectors, for use in an apparatus for forming three-dimensional objects on a layer-by-layer basis. More particularly, it is directed to an apparatus and method having the ability to shift a projected image a small amount to either project the image in the correct feature position or to permit multiple exposures in the same cross-sectional plane to obtain edge smoothness in the three-dimensional object being formed from a liquid medium solidifiable in response to exposure by UV or visible light.

BACKGROUND OF THE INVENTION

In recent years, many different techniques for the fast production of three-dimensional models have been developed for industrial use. These solid imaging techniques are sometimes referred to as rapid prototyping and manufacturing ("RP&M") techniques. In general, rapid prototyping and manufacturing techniques build three-dimensional objects layer-by-layer from a working medium utilizing a sliced data set representing cross-sections of the object to be formed. Typically, an object representation is initially provided by a Computer Aided Design (CAD) system.

Stereolithography, presently the most common RP&M technique, was the first commercially successful solid imaging technique to create three-dimensional objects from CAD data. Stereolithography may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) using a computer controlled laser beam of ultraviolet (UV) radiation into successive laminae according to the two-dimensional layer data. During transformation, the successive laminae are bonded to previously formed laminae to allow integral formation of the three-dimensional object. This is an additive process. More recent designs have employed the use of visible light to initiate the polymerization reaction to cure the photopolymer build material that is commonly referred to as resin.

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes. While stereolithography has shown itself to be an effective technique for forming three-dimensional objects, other solid imaging technologies have been developed over time to address the difficulties inherent in stereolithography and to provide other RP&M advantages.

These alternate technologies, along with stereolithography, have collectively been referred to as solid freeform fabrication or solid imaging techniques. They include laminated object manufacturing (LOM), laser sintering, fused deposition modeling (FDM), and various ink jet based systems to deliver either a liquid binder to a powder material or a build material that solidifies by temperature change or photocuring. Most recently a technology using digital light processing technology has employed visible light to initiate the photopolymerization reaction to cure a photopolymer build material, commonly referred to as a resin. Each of these additive technologies have brought various improvements in one or more of accuracy, building speed, material properties, reduced cost, and appearance of the build object During the same time period that solid imaging or solid freeform fabrication has evolved, the two-dimensional imaging industry evolved ways to displace the projected image on a screen or, in the case of the printing industry, on a receiving substrate. These approaches addressed the basic problem that digital light projectors produce images with coarse resolution. Digital light projectors typically project only 100 pixels per inch for an image size of 10.24 inches by 7.68 inches. The photographic printing industry especially has employed techniques to shift a two-dimensional color image to improve resolution by a variety of techniques, including moving the light source or light valve. Other approaches have included moving or shifting the photographic paper, using polarizing and double refracting plates, and, in the case of image projection systems, using multiple spatial light modulators. All of these systems have addressed the inherent limitation of image distortion when projecting resized digital images or the problem of light valve projectors, such as a liquid crystal display (LCD) or a digital micro-mirror device (DMD), having a fixed number of pixels. Attempting to utilize image displacement techniques with digital image projections in solid imaging applications presents unique problems because of the three-dimensional aspect of the object being created. The problems of two-dimensional digital image projection, when applied to three-dimensional solid imaging, cause inaccurate feature placement, potential loss of feature details, and smoothness of curves or edges on objects being built to be roughened or uneven and poorly defined.

Additionally, none of the prior solid freeform fabrication approaches, while making substantial improvements, have yet to achieve a truly low cost system that produces highly accurate and visually appealing three-dimensional objects in a short build time.

These problems are solved in the design of the present invention by combining a low cost solid imaging technique with the use of digital imaging projection in a manner that preserves object features and achieves object edge smoothness in three-dimensional object fabrication.

SUMMARY OF THE INVENTION

It is an aspect of the present invention that an apparatus is provided that achieves high resolution imaging in three-dimensional objects built using UV or visible light and a photopolymer material.

It is another aspect of the present invention that an entire image cross-section is projected onto a solidifiable medium so the projected pixel image is aligned to the correct feature position of the three-dimensional object being built.

It is still another aspect of the present invention that multiple different image exposures are projected onto the solidifiable medium to form one of multiple cross-sections comprising the three-dimensional object being built from the same CAD and sub-pixel displaced sliced image data.

It is a feature of the present invention that an algorithm is used to control the image projected by the digital light projector onto the solidifiable medium in each cross-section of the three-dimensional object being built.

It is another feature of the present invention that the projected pixel image is moved a fraction of a pixel in the multiple different exposures of each cross-section of the three dimensional object being built to obtain correct feature position and edge smoothness.

It is yet another feature of the present invention that the image projected onto the solidifiable medium can be moved by one of several techniques including rotating a transparent plane or two transparent planes about one or more axes placed between the projector and the target area of the cross-section, moving the digital light projector, rotating the mirrors that project the image or moving the cross-section being built.

It is an advantage of the present invention that a low cost solid imaging device is obtained that provides high resolution.

It is another advantage of the present invention that accurate feature placement in each cross-section in a three-dimensional object being built layer-by-layer is obtained so that accurate feature placement is not lost due to the fixed number of pixels that can be projected in a single image projection by a digital light projector.

It is still another advantage of the present invention that edge filling is accomplished to provide smooth edges in each cross-section in a three-dimensional object being built layer by layer using a digital light projector.

These and other aspects, features, and advantages are obtained by the present invention through the use of a solid imaging apparatus and method that employ a pixel shift in successive exposures of a cross-section and an algorithm that controls the exposure of multiple images projected onto a solidifiable liquid medium in each cross-section of a three-dimensional object being built to create an object with high resolution and no lost features or uneven or rough edges.

BRIEF DESCRIPTION OF THE DRAWING

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Figure 1:
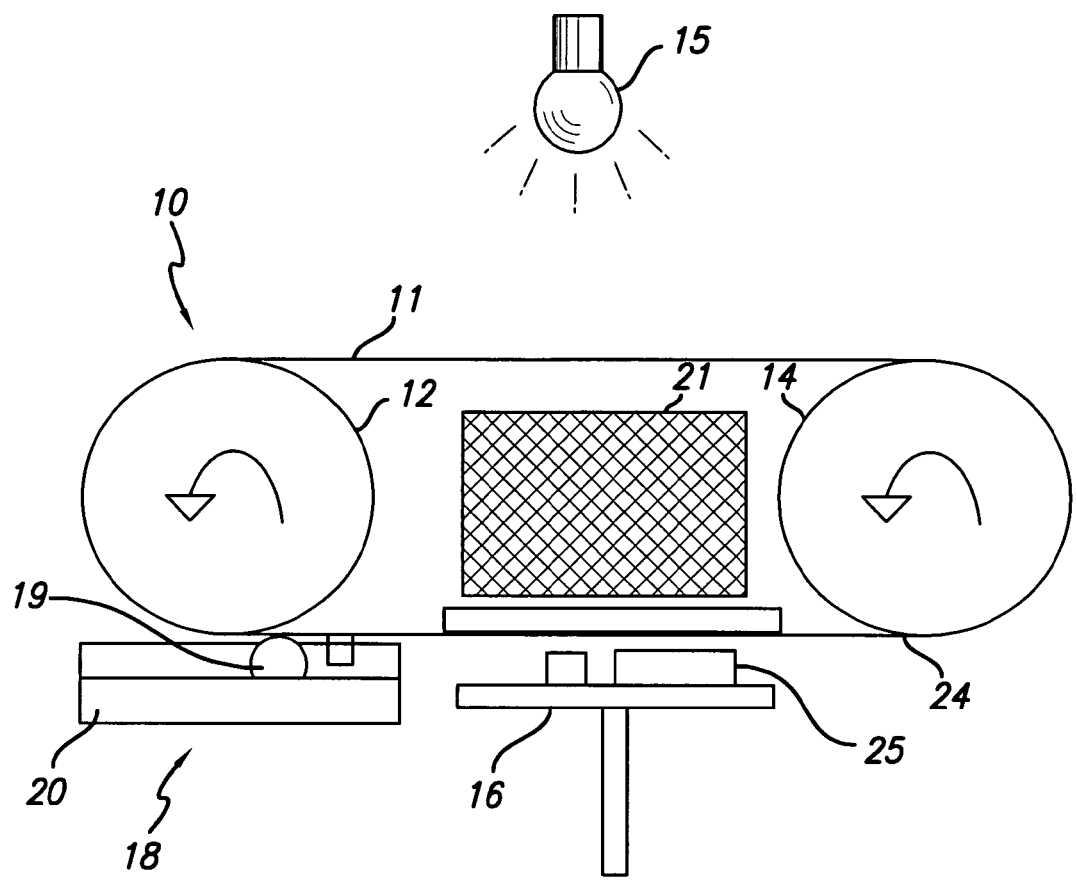
FIG. 1 is a diagrammatic illustration of a flexible transport solid imaging system utilizing the present invention.

Flexible transport solid imaging of the type disclosed herein involves the layer-by-layer build-up of articles from a visible or UV liquid photopolymer material that is delivered by the flexible transport endless belt or reciprocatable sheet of film. Liquid photopolymer material is applied to the endless belt or reciprocatable sheet of film from a cartridge employing a gravure wheel that picks up the photopolymer and transfers it to the flexible transport device to provide a fresh material to create new layers as the object is built. The photopolymer is imaged by radiation projected from either a digital UV projector or a digital visible light projector. The projector includes spatial light modulator, such as a digital micro-mirror device ("DMD"), that selectively illuminates pixels for imaging. Visible light projection is a preferred approach.

Solid imaged parts are preferably built on an elevator platform that moves the build object or part up into contact with the liquid photopolymer and, after exposure, down and out of contact with the liquid photopolymer as successive layers or laminae are formed during the building process. The build object can be built on structures known as supports rather than directly on the elevator platform. Supports are used for more complex three-dimensional objects being built that have unsupported or partially unsupported surfaces.

Commercially available digital light projectors, optionally modified to have a shorter focal length, may be employed, such as those available from InFocus Corporation of Wilsonville, Oreg. and BenQ America Corp. of Irvine, Calif. However, digital light projectors inherently have limited resolution. For example, if a 1024 by 768 pixel image is projected over a 10.24 inch by 7.68 inch area the effective resolution is 100 dpi (100 dots per inch). In this case the minimum feature size is 0.010 inch, part features may be located as far off their correct position as 0.005 inch, and a wall drawn at 45° to the X or Y axis will have a peak to peak roughness of 0.007 inch. Also, walls along the X and Y axes will exhibit roughness.

Sub-pixel image shifting is a way to improve accuracy and edge smoothness in three-dimensional objects crated by solid imaging. This approach is based on exposing a full sized image, and then shifting the image plane half a pixel or less, adjusting the projected image to match the new image position, and then exposing again. With this technique, and shifting half a pixel in the X and Y planes, the 10.24 inch by 7.68 inch area described above would look like it had an effective resolution of 200 dpi. If the image is shifted twice at one third of a pixel, and exposed three times, it has an effective resolution of 300 dpi, etc. In these cases the accuracy and the wall smoothness of the solid image or three-dimensional object built are improved.

In one application of the present invention, the photopolymer material is delivered to the imaging area via a transparent flexible transport film such as polypropylene or polycarbonate. The photopolymer is applied in a thin layer to the flexible transport film in the embodiment shown in FIG. 1.

As seen in FIG. 1, a flexible transport imaging system indicated generally by the numeral 10, has a transparent transport means in the form of an endless belt 11 that is positioned about a driving roller 12 and a follower roller 14. A digital light projector is the light source 15 that projects an image with selected pixels for illumination onto a mirror (not shown) below the upper run of endless belt 11 in the exposure of a cross-section of a three-dimensional object 25 being formed on a support platform 16. Support platform 16 is raised and lowered to bring the cross-sectional layers being formed into contact with the layer of build material 24 that is deposited on endless belt 11 from the resin or solidifiable liquid medium cartridge indicated generally by the numeral 18. Cartridge 18 includes a resin reservoir of solidifiable liquid medium 20 and a gravure roller 19 that applies the solidifiable liquid medium to belt 11. A transparent backing plate 22 can be employed. A sub-pixel image placement device, indicated generally by the numeral 21, is placed between the light source 15 and the target area on the belt 11 that is coated with the solidifiable liquid medium 24. The exposure of the image cross-section by illuminating selected pixels creates a solidified portion of the cross-section of the three-dimensional object being formed. Device 21 alternatively can be a mirror with the pixel shifting device being located outside of the runs of the endless belt 11 or it could combine both the mirror and the pixel shifting device in a single element.

Figure 2:
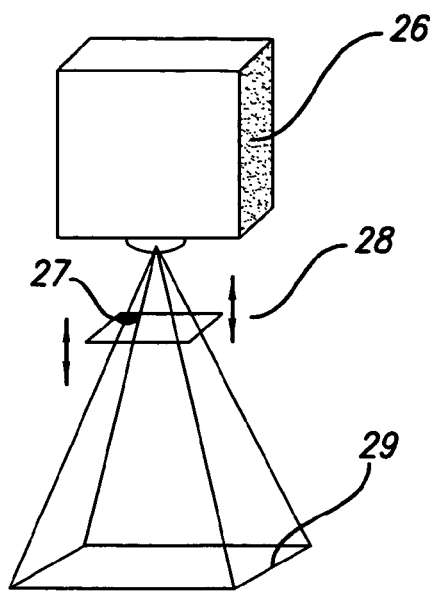
FIG. 2 is a diagrammatic illustration of a digital image displacement device rotatable about a fixed point useful to create three-dimensional objects.

Looking now at FIG. 2, there is shown in a diagrammatic illustration of one embodiment of a pixel image displacement device that can be employed in a solid imaging system to create solid objects by successively creating thin layers of a solidified material one on top of the other by use of a digital light projector light to selectively illuminate pixels on the surface of a solidifiable liquid medium. FIG. 2 shows a digital light projector 26 projecting an image through a transparent plate 28 rotatable about a fixed point 27 onto the image plane 29 on the surface of a solidifiable liquid medium to form a cross-section of a three-dimensional object. The plate 28 can be a glass plate that is mounted on a two axis mirror mount to displace by a fraction of a pixel the pixels in a projection of a full image of the cross-section of a three-dimensional object. The plate 28 is moved through a tilt angle Θ that determines the amount of pixel displacement. In this embodiment, by way of example, the relationship between the tilt angle (Θ) of the glass plate and the displacement in the image plane (d) is given by the equation:

$$d = l \cos \Theta [\tan \Theta - \tan(a \sin(\sin \Theta/n))]$$

where l is the thickness of the glass and n is the index of refraction.

Figure 3:
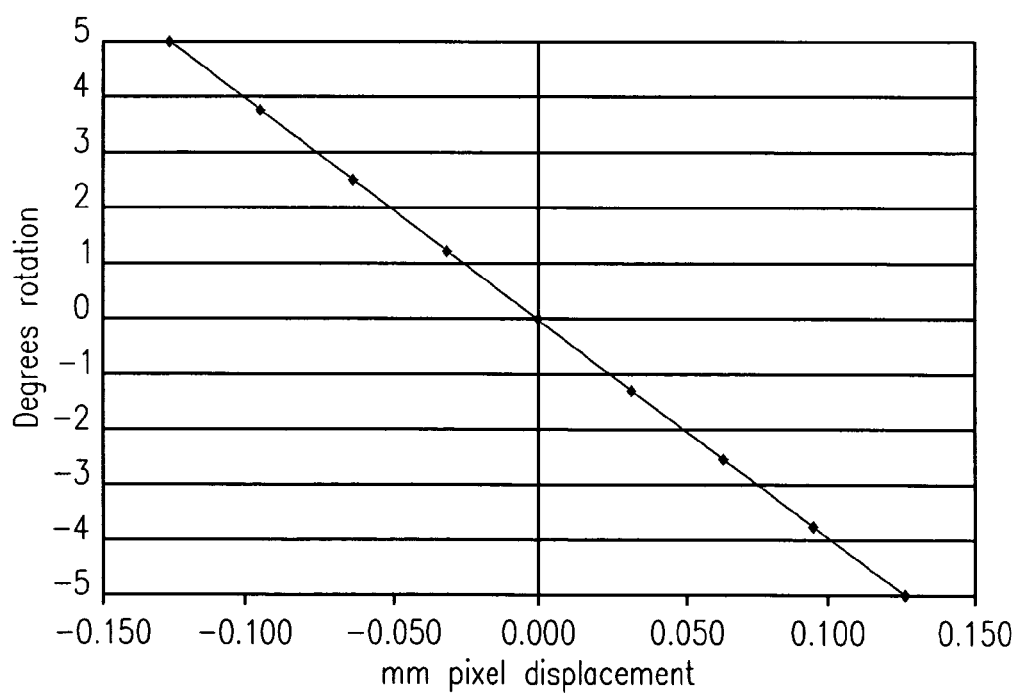
FIG. 3 is a graphical illustration of the amount of pixel displacement obtainable from rotation of one embodiment of a sub-pixel image displacement device.

FIG. 3 gives a graphical illustration showing this displacement for the case of n=1.5 and l=4.35 mm. A tilt angle of 5° corresponds to a shift of ½ pixel for a 4 pixels per mm image.

Figure 4:
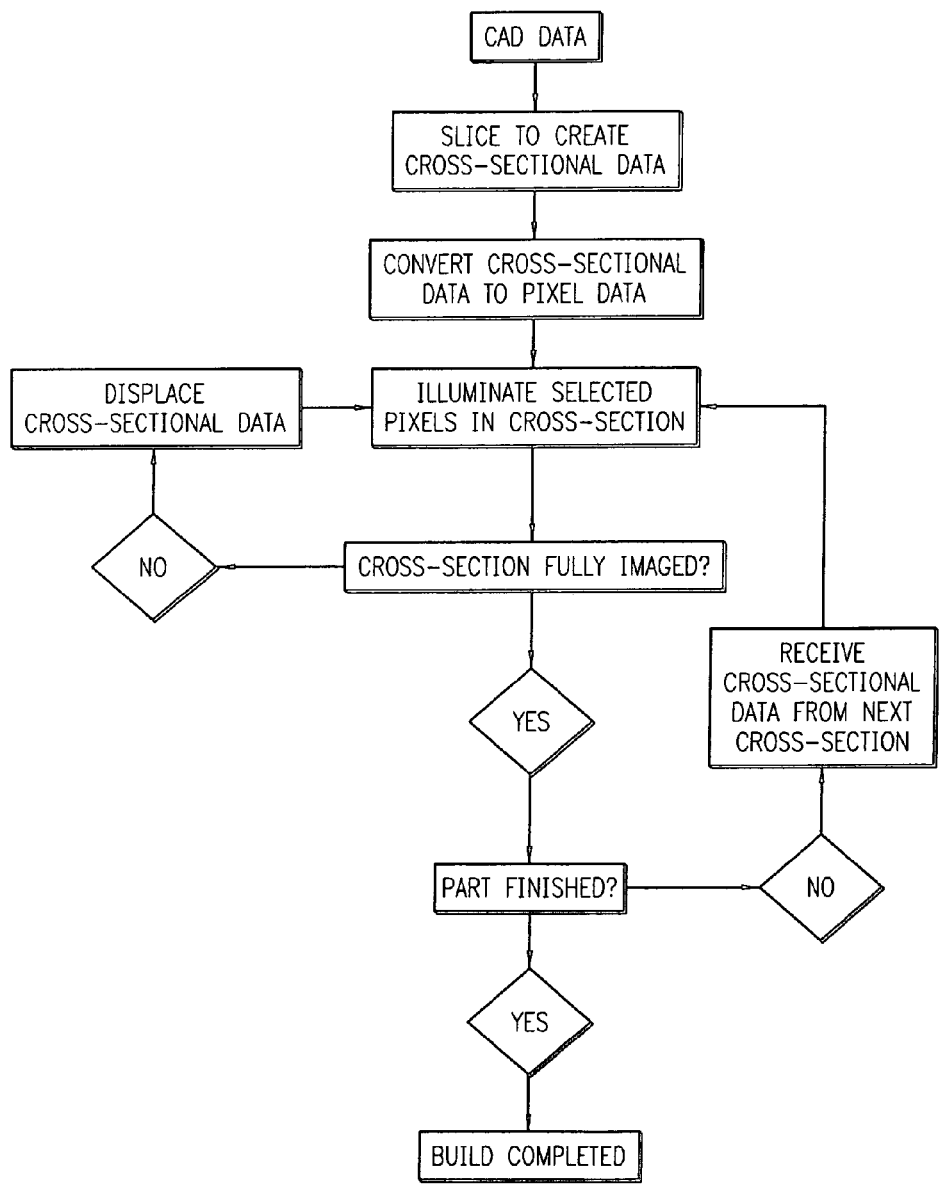
FIG. 4 is a flow diagram of the processing of data and the pixel illumination process employed to create a three-dimensional object using a digital light projector.

FIG. 4 shows the flow diagram of the process employed to create a three-dimensional object using the process and apparatus of the present invention.

Figure 5A:
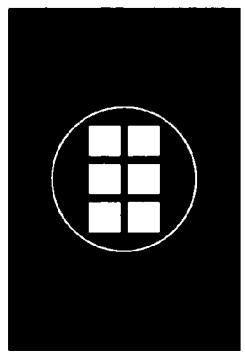
FIGS. 5A-C are illustrating the illumination of full pixels in successive exposures within the boundary of a cross-section on a solidifiable liquid medium with no pixel shift and an additional exposure with a shift of ½ pixel in the X and Y directions.
Figure 5B:
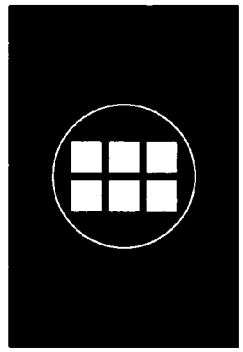
Figure 5C:
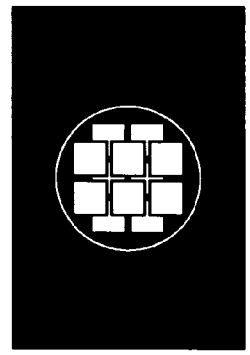

Data is sent to the solid imaging system from a CAD station (not shown) that converts the CAD data to a suitable digital layer data format and feeds it to a computer control system (also not shown) where the object data is manipulated to optimize the data via an algorithm to provide on/off instructions for the digital light projector. The solid imaging layer data is attained by the CAD data being processed by a slicing program to create cross-sectional data. The algorithm is then applied to the cross-sectional data by a suitable controller, such as a microprocessor or computer, to create the instructions for the digital light projector to illuminate selected pixels in the image within the boundary of the three-dimensional object in the cross-section being formed. The algorithm can select pixels for illumination that are only full pixels within the boundary of the image in the cross-section being exposed as seen in FIGS. 5A-C. FIG. 5A illustrates a first exposure of a cross-sectional layer. FIG. 5B illustrates a second exposure of the same cross-sectional layer with the pixels shifted in the X and Y directions. FIG. 5C is the resultant exposure on the same cross-sectional layer of the two exposures illustrated in FIGS. 5A and 5B. Alternatively as desired, the algorithm can select as pixels for illumination only those pixels having a desired percentage, ranging from about 1% to about 100%, of the full pixel within the boundary of the image in the cross-section being exposed depending upon the number of exposures and pixel shifts to be done within each cross-section. For example, if only two exposures and hence only one pixel shift is to be done in each cross-section, it is desirable to illuminate only those pixels that have a lower percentage of the full pixel within the boundary of the image in the cross-section being exposed to increase the covered area, the resolution and edge smoothness of the image. Contrarily, if a higher number of exposures, such as 5 and hence 4 pixel shifts, is to be done in each cross-section, then illumination of only those pixels having a higher percentage of the full pixel within the boundary of the image would occur. Additionally, the algorithm may factor in the area of the pixel within the boundary of the image in the cross-section separately or in combination with a selected angle that the image boundary goes through the pixels within the image in the cross-section being exposed. At some desired percentage of pixels within the boundary of the cross-section being exposed, the image will be larger than desired. In this instance some "line width correction" of the cross-section's boundary will be required. Where supports are used in the build process, either with two separate materials or one material that is the same for the build object and the supports, no pixel shifting or second exposure in each support cross-section is utilized in a second support generating algorithm and any pixel having any portion of a support within the boundary of the image is illuminated.

As seen in FIG. 4, the cross-sectional data, including boundary and fill data for the object, is converted to pixel data and then processed to determine which selected pixels are to be illuminated as they fall within the boundary of the image in the cross-section be exposed. After the first exposure, the cross-sectional data is displaced by the desired sub-pixel distance and the cross-section is again illuminated with selected pixels. If the cross-section is full imaged, the process then returns to receive cross-sectional data from the next cross-section and the process is continued until a three-dimensional object is completed. Alternatively, if the cross-section is not full imaged, the cross-sectional data is displaced and selected pixels are illuminated in a process that continues until the cross-section is full imaged.

As previously stated, either an ultraviolet ("UV") digital radiation projector or a visible digital light projector system may be used to cure the photocurable solidifiable liquid medium. With either type of a digital light projector, an algorithm that selects out pixels in a cross-section that have previously been exposed can be employed to prevent overcuring of the resin in those areas. Such overcuring can cause part curl, shrinkage and part distortion. Additionally, it is possible to convert the image boundaries to a bit map and then shift only those pixels that contain the boundaries to obtain the required sub-pixel placement accuracy edge smoothness.

Any suitable fluid medium capable of solidification in response to the application of an appropriate form of energy stimulation may be employed in the practice of the present invention. Many liquid state chemicals are known which can be induced to change to solid state polymer plastic by irradiation with UV radiation or visible light. A suitable visible visible light curable photopolymer that may be employed in the practice of the present invention is shown in Table I below.

This formulation exhibited excellent resolution and photospeed when utilized with a BenQ PB7220 projector. The parts created displayed outstanding green strength with balanced stiffness and toughness.

TABLE 1

|  | Units of Weight | Weight Percent % |
| --- | --- | --- |
| Acrylate-24 (from Sartomer Company) | | |
| PRO 6817 (from Sartomer Company) | 4.8 | 23.02 |
| SR 833S (from Sartomer Company) | 3.5 | 16.79 |
| Ebecryl 83 (from UCB Chemicals Corp.) | 2.4 | 11.51 |
| PRO 6169 (from Sartomer Company) | 5.2 | 24.94 |
| SR 531 (from Sartomer Company) | 3.6 | 17.27 |
| Irgacure I-907 (From Ciba Specialty Chemicals, Inc.) | 0.75 | 3.60 |
| Irgacure I-819 (From Ciba Specialty Chemicals, Inc.) | 0.6 | 2.88 |
| Total | 20.85 | 100.00 |

Additives can be incorporated into the formulation to promote release ability from the transparent transport means, such as silicone acrylate materials.

Alternatively, the image projected onto the solidifiable liquid medium for solid imaging an object can be shifted by rotating or otherwise moving the image shifting mirror or by physically moving the cross-section being built.

While the invention has been described above with references to specific embodiments thereof, it is apparent that many changes, modifications and variations in the materials, arrangements of parts and steps can be made without departing from the inventive concept disclosed herein. For example, the sub-pixel image displacement technique could equally well be employed in a modified stereolithography apparatus having a vat employing a UV or visible digital light projector in place of a laser. An example of such a stereolithography apparatus that could easily be modified is a Viper Si2™ SLA® system available commercially from 3D Systems, Inc., the assignee of the present invention. The sub-pixel image displacement device employs at least one rotatable transparent plate as described herein, rotatable mirrors, shiftable digital light projectors or a shiftable support platform to displace the pixels in the image of a projected cross-section of a three-dimensional object being formed from a solidifiable liquid medium. The liquid medium forms a fresh layer to be solidified either by a deep dip technique or by use of a recoater that places a fresh layer of liquid material onto an already exposed and solidified cross-section of the three-dimensional object being formed, as described in U.S. Pat. Nos. 5,902,537 and 6,048,487 both assigned to the assignee to the present invention. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, What is claimed is:

1. A method for forming a three-dimensional object layer-by-layer from a photocurable solidifiable liquid medium, the method comprising:

projecting an image representative of cross-sectional image data from a radiation source to selectively illuminate pixels in an image plane in a first exposure to selectively solidify a layer of photocurable solidifiable liquid medium;

shifting the image by a subpixel amount to a new image position by rotating a transparent plate positioned between the radiation source and the image plane through an angle in one of an X- or Y-plane to shift the image;

adjusting the image to match the new image position to define adjusted image; and projecting the adjusted image to selectively illuminate pixels it the image plane in a second exposure to selectively solidify the same layer of photocurable solidifiable liquid medium.

2. The method according to claim 1 further comprising shifting the image by rotating a transparent plate positioned between the radiation source and the image plane independently through an angle in the X-plane and the Y-plane to shift the image.

3. The method according to claim 1 further comprising shifting the image by rotating a first transparent plate in the X-plane and a second transparent plate in the Y-plane, the transparent plates being positioned between the radiation source and the image plane.

4. The method according to claim 1 further comprising shifting the image by moving the radiation source.

5. The method according to claim 1 further comprising shifting the image by moving the imaging area.

6. The method according to claim 1 further comprising using an algorithm to select pixels for illumination so that only those pixels are illuminated that have a fill pixel within a boundary of the image in the cross-section being exposed.

7. The method according to claim 1 further comprising using an algorithm to select pixels for illumination so that only those pixels are illuminated that have a desired percentage of the fill pixel within a boundary of the image in the cross-section being exposed.

8. The method according to claim 1 further comprising using an algorithm to select pixels for illumination so that only those pixels are illuminated that have the boundary of the image pass therethrough at a selected angle in the cross-section being exposed.

9. The method according to claim 1 further comprising displacing the cross-sectional image by moving mirrors positioned between the radiation source and the transparent transport means.

10. A method for forming a three-dimensional object layer-by-layer from a photocurable solidifiable liquid medium, the method comprising:

a. receiving three-dimensional CAD data of an object to be built;

b. processing the three-dimensional CAD data to receive slice data representative of cross-sectional layers of the object;

c. converting the slice data into bit-map data;

d. providing a layer of photocurable solidifiable liquid medium in an imaging area;

e. projecting an image representative of cross-sectional image data from a radiation source onto the photocurable solidifiable liquid medium in the imaging area to selectively illuminate pixels in an image plane in a first exposure to selectively solidify the layer of photocurable solidifiable liquid medium;

f. shifting the image by a subpixel amount to a new image position by rotating a transparent plate positioned between the radiation source and the image plane through an angle in one of an X- or Y-plane to shift the image;

g. adjusting the image to match the new image position to define an adjusted image;

h. projecting the adjusted image to selectively illuminate pixels in the image plane in a second exposure to selectively solidify the same layer of photocurable solidifiable liquid medium; and i. repeating steps d-h multiple times until a complete object is formed.

11. The method according to claim 10 further comprising shifting the image by rotating a transparent plate positioned between the radiation source and the image plane independently through an angle in the X-plane and the Y-plane to shift the image.

12. The method according to claim 10 further comprising shifting the image by rotating a first transparent plate in the X-plane and a second transparent plate in the Y-plane, the transparent plates being positioned between the radiation source and the image plane.

13. The method according to claim 10 further comprising shifting the image by moving the radiation source.

14. The method according to claim 10 further comprising shifting the image by moving the imaging area.

15. The method according to claim 10 further comprising using an algorithm to select pixels for illumination so that only those pixels are illuminated that have a full pixel within a boundary of the image in the cross-section being exposed.

16. The method according to claim 10 further comprising using an algorithm to select pixels for illumination so that only those pixels are illuminated that have a desired percentage of the full pixel within a boundary of the image in the cross-section being exposed.

17. The method according to claim 10 further comprising using an algorithm to select pixels for illumination so that are only those pixels are illuminated that have the boundary of the image pass therethrough at a selected angle in the cross-section being exposed.

18. The method according to claim 10 further comprising using an algorithm to select out pixels for non-illumination so that only those pixels are illuminated in a subsequent illumination in areas that have not previously been illuminated in the cross-section being exposed.

* * * * *